(12) United States Patent
Hata et al.

(10) Patent No.: US 6,724,987 B2
(45) Date of Patent: Apr. 20, 2004

(54) LENS-FITTED PHOTO FILM UNIT WITH ELECTRONIC FLASH DEVICE

(75) Inventors: Yukitsugu Hata, Minami-Ashigara (JP); Hirokazu Yokoo, Minami-Ashigara (JP); Katsumi Motomura, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/142,771

(22) Filed: May 13, 2002

(65) Prior Publication Data
US 2002/0181949 A1 Dec. 5, 2002

(30) Foreign Application Priority Data

May 11, 2001 (JP) ........................................ 2001-140914

(51) Int. Cl.[7] .............................................. G03B 15/03
(52) U.S. Cl. ........................................ 396/161; 396/165
(58) Field of Search .................................. 396/159–163, 396/170, 179, 165

(56) References Cited

U.S. PATENT DOCUMENTS

| 3,779,142 A | 12/1973 | Yata et al. | |
| 3,792,484 A | * 2/1974 | Tsujimoto et al. | 396/159 |
| 4,074,287 A | 2/1978 | Iwata et al. | |
| 4,241,279 A | 12/1980 | Numata | |
| 6,443,638 B1 | * 9/2002 | Kamata | |
| 6,477,325 B1 | 11/2002 | Tobioka | 396/6 |
| 2002/0061191 A1 | 5/2002 | Motomura et al. | 396/165 |

FOREIGN PATENT DOCUMENTS

| JP | A 11-344291 | 12/1999 | |
| JP | A 200-349834 | 12/2000 | |
| JP | A 2001-83562 | 3/2001 | G03B/7/099 |

* cited by examiner

Primary Examiner—W. B. Perkey
(74) Attorney, Agent, or Firm—Young & Thompson

(57) ABSTRACT

A lens-fitted photo film unit includes a flash emitter for emitting flash light toward a photographic object in flash photography. A flash amount control circuit quenches flash emission of the flash emitter when a value of integration of light reflected by the object as measured by a first sensor in the flash photography comes up to a predetermined level. An aperture stop device designates one of a large aperture state and a small aperture state. A switch disables the flash amount control circuit if the small aperture state is designated, and enables the flash amount control circuit if the large aperture state is designated. The switch regulates operation of the flash amount control circuit in order to raise an amount of the flash light at a time of the flash photography in the small aperture state.

14 Claims, 10 Drawing Sheets

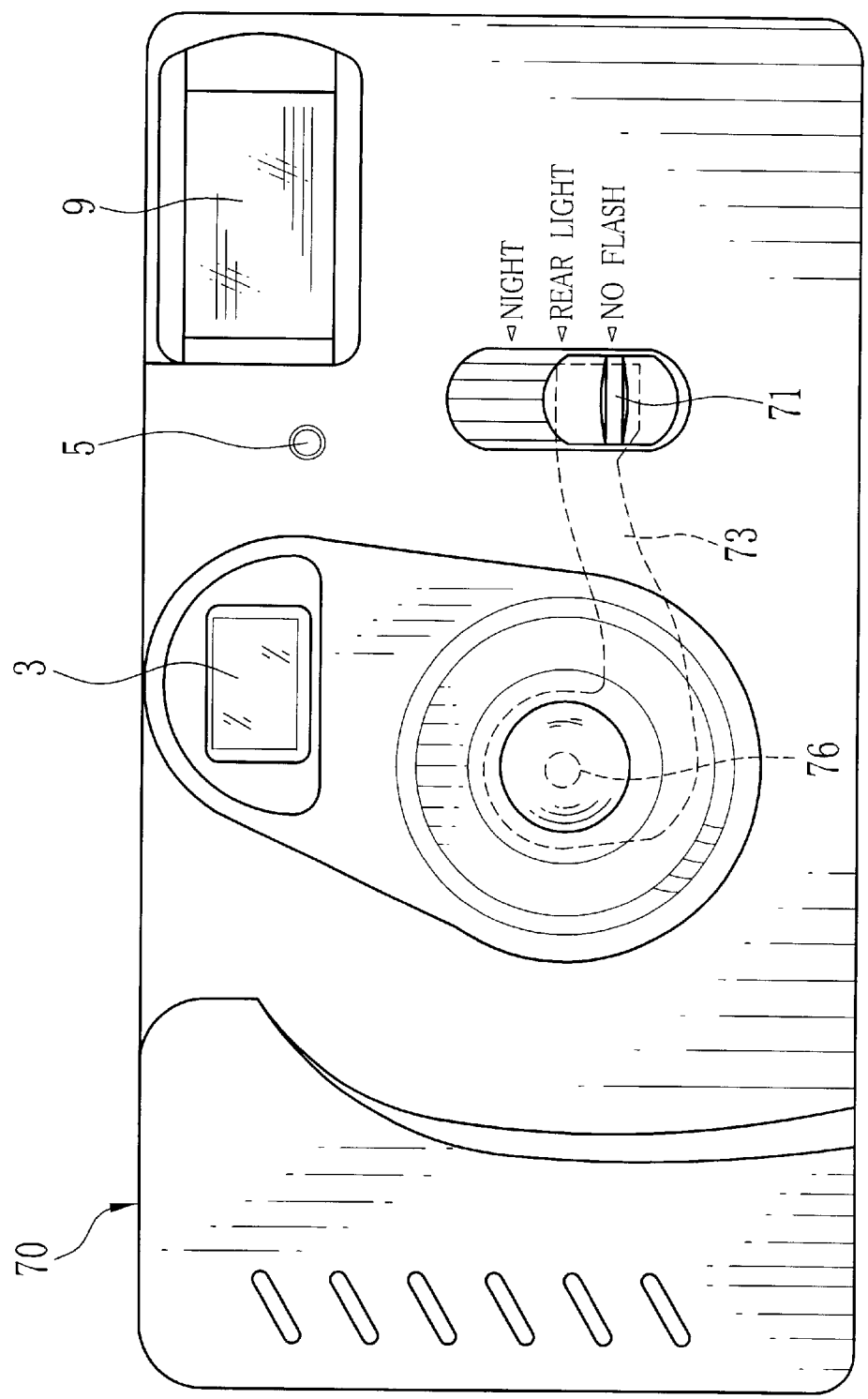

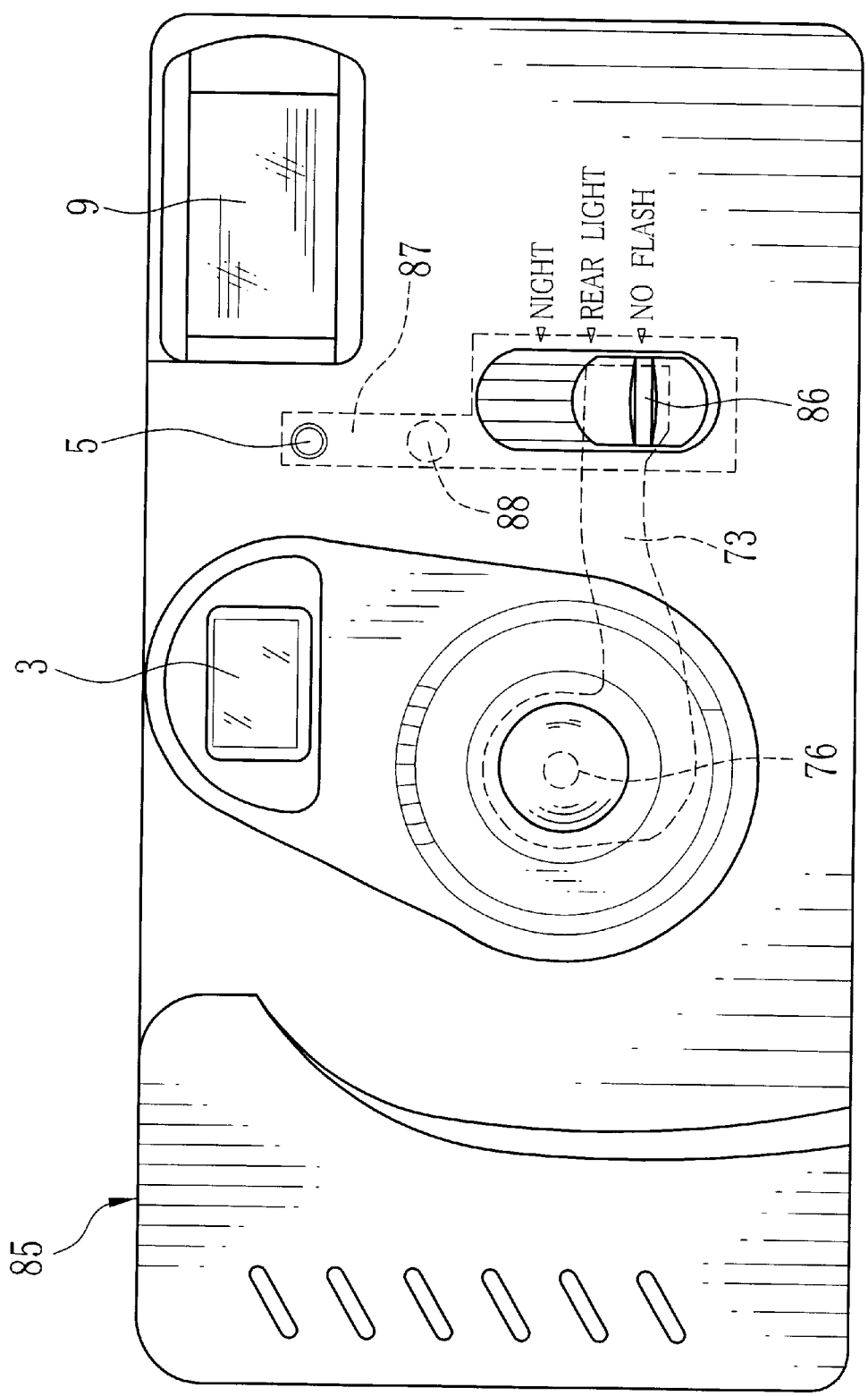

LENS-FITTED PHOTO FILM UNIT WITH ELECTRONIC FLASH DEVICE

BACKGROUND OF THE INVENTION

1. Field of the Invention

The present invention relates to a lens-fitted photo film unit with an electronic flash device. More particularly, the present invention relates to a lens-fitted photo film unit with an electronic flash device with which daylight synchronization photography can be acceptably effected to take an exposure agreeably even for a rear light scene.

2. Description Related to the Prior Art

A lens-fitted photo film unit pre-loaded with unexposed photo film is widely used. Various ideas for lowering the cost of lens-fitted photo film units are known. In relation to exposure of each frame, the lens-fitted photo film unit has a construction including a fixed aperture stop and a shutter device of a fixed shutter speed. Also, a flash device in the lens-fitted photo film unit emits flash light at a fixed amount. It is likely that a photograph is taken in an underexposed or overexposed result due to lack of control of exposure according to types of scene to be photographed. It has been conceived to provide a lens-fitted photo film unit with an exposure control structure. It should be considered to minimize the rise in the manufacturing cost due to addition of the exposure control structure.

It is preferable in a lens-fitted photo film unit to automate control of exposure, as it should be handled easily even by unfamiliar users. To control the exposure, it is easier to change over the aperture stop than to change the shutter speed. JP-A 2001-083562 discloses an aperture stop device, which includes an aperture stop plate having a stop-down opening, and is changeable over between large and small aperture states by shifting the aperture stop plate. The aperture stop device, when in the large aperture state, sets a stationary stop opening effective, and when in the small aperture state, sets the stop-down opening effective.

If a principal object is located at a very near distance, flash light applied to the object has too high intensity, to create an overexposed state when the object is photographed. In the field of camera, a flash light amount control circuit is known, in which flash light reflected by the object is measured by a sensor, which quenches emission of the flash light when a value of integration of a current generated from the sensor comes up to a predetermined limit.

If a rear light scene is normally photographed, there occurs an underexposure in a principal object, which has lower brightness than a background. It is preferable to effect daylight synchronization photography, in which flash light is applied to a scene under daylight. However, the lens-fitted photo film unit with the stop changeable structure and flash adjusting structure is set in the small aperture state according to the high brightness from the background. A problem occurs in insufficiency in the effect of flash light. The underexposed state of the principal object cannot be prevented from occurrence. Also, the same problem arises in the construction of manually changing over the aperture stop and with the small aperture state designated.

SUMMARY OF THE INVENTION

In view of the foregoing problems, an object of the present invention is to provide a lens-fitted photo film unit with an electronic flash device with which a principal object can be photographed at an optimized exposure in daylight synchronization photography.

Another object of the present invention is to provide a lens-fitted photo film unit with an electronic flash device with which a flash light amount control circuit can be regulated to increase an amount of flash light in daylight synchronization photography.

In order to achieve the above and other objects and advantages of this invention, a lens-fitted photo film unit includes a flash emitter for emitting flash light toward a photographic object in flash photography. A flash amount control circuit quenches flash emission of the flash emitter when a value of integration of light reflected by the object in the flash photography comes up to a predetermined level, the light being measured by a first sensor. An aperture stop device designates one of a large aperture state and a small aperture state. Regulating means regulates operation of the flash amount control circuit in order to raise an amount of the flash light at a time of the flash photography when the small aperture state is designated.

The aperture stop device includes a stationary stop opening disposed in a photographic light path, a movable aperture stop plate shiftable into and out of the photographic light path, and a small-size stop-down opening formed in the movable aperture stop plate. The movable aperture stop plate is set away from the photographic light path if the large aperture state is designated, and is set in the photographic light path if the small aperture state is designated.

The aperture stop device further includes a second sensor for measuring brightness of the object. An aperture stop plate drive unit shifts the movable aperture stop plate according to the object brightness, so as to shift the movable aperture stop plate away from the photographic light path when the object brightness is low, and into the photographic light path when the object brightness is high.

The regulating means includes a switch, responsive to a signal from the aperture stop plate drive unit, for disabling the flash amount control circuit if the small aperture state is designated, and for enabling the flash amount control circuit if the large aperture state is designated.

The switch is a semiconductor switch, connected in series with the first sensor, being nonconductive if the small aperture state is designated, and being conductive if the large aperture state is designated.

In a preferred embodiment, furthermore, an externally operable mode selector designates a selected one of a flash off-mode, a first flash mode, and a second flash mode, to disable the flash emitter in designating the flash off-mode, to enable the flash emitter in designating the first or second flash mode, to set the movable aperture stop plate in the photographic light path in designating the first flash mode, and to set the movable aperture stop plate away from the photographic light path in designating the second flash mode.

The movable aperture stop plate is connected with the mode selector.

The regulating means includes a filter plate for moving according to the mode selector, the filter plate is disposed in front of the first sensor when the first flash mode is selected, and is disposed away from the first sensor when the second flash mode is selected.

In another preferred embodiment, the regulating means includes a switch, changed over by the mode selector, for disabling the flash amount control circuit when the first flash mode is selected, and for enabling the flash amount control circuit when the second flash mode is selected.

The switch is connected in series with the first sensor, is turned off when the first flash mode is selected, and is turned on when the second flash mode is selected.

Consequently, a principal object can be photographed at an optimized exposure in daylight synchronization photography, as the flash light amount control circuit is regulated to increase an amount of flash light in daylight synchronization photography, to emit flash light in full emission without quench according to designation of the small aperture state of the aperture stop.

BRIEF DESCRIPTION OF THE DRAWINGS

The above objects and advantages of the present invention will become more apparent from the following detailed description when read in connection with the accompanying drawings, in which:

FIG. 5 is a front elevation illustrating another preferred lens-fitted photo film unit in which a movable aperture stop plate is kept shiftable by linkage with a mode selector;

FIG. 8 is a front elevation illustrating another preferred embodiment in which a movable aperture stop plate and a filter plate are changed over by a mode selector;

DETAILED DESCRIPTION OF THE PREFERRED EMBODIMENT(S) OF THE PRESENT INVENTION

Figure 1:
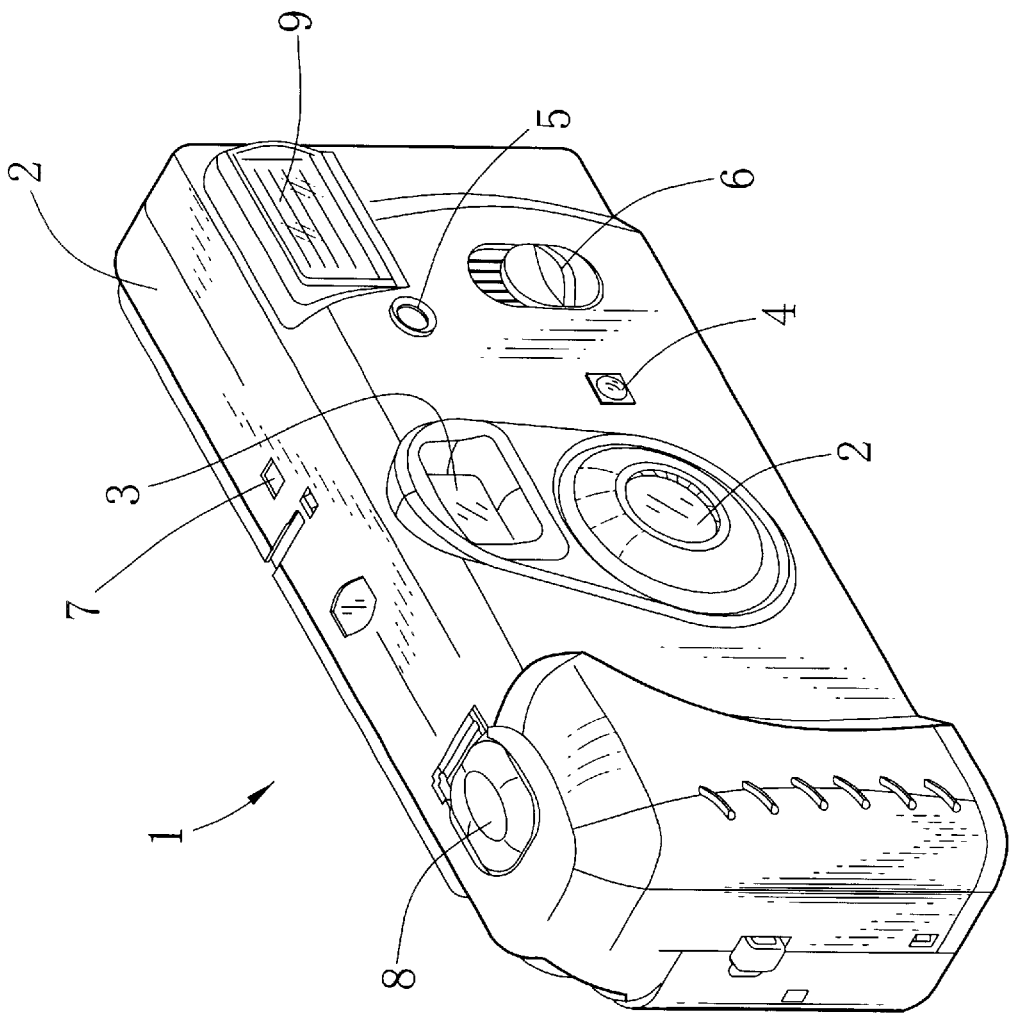
FIG. 1 is a perspective illustrating a lens-fitted photo film unit.

In FIG. 1, a lens-fitted photo film unit 1 is illustrated. A front side of the lens-fitted photo film unit 1 is provided with a taking lens 2, a viewfinder window 3, a brightness measuring window 4 and a reflected flash measuring window 5. A flash switch lever or button 6 is slid up and set in the ON position, to turn on an electronic flash device, which starts storing charge. When charging is completed, a light emitting diode (LED) 37 is turned on to emit light. See FIG. 3. A standby indicator window 7 is used to observe light at the LED 37. A shutter release button 8 is depressed after the charging. A flash emitter 9 emits flash light toward a photographic field, to take an exposure with the flash light. If the flash switch lever 6 is slid down and set in the OFF position, the flash device is turned off. A photographic object is taken under daylight, as no flash light is emitted in operation of the shutter device.

Figure 2:
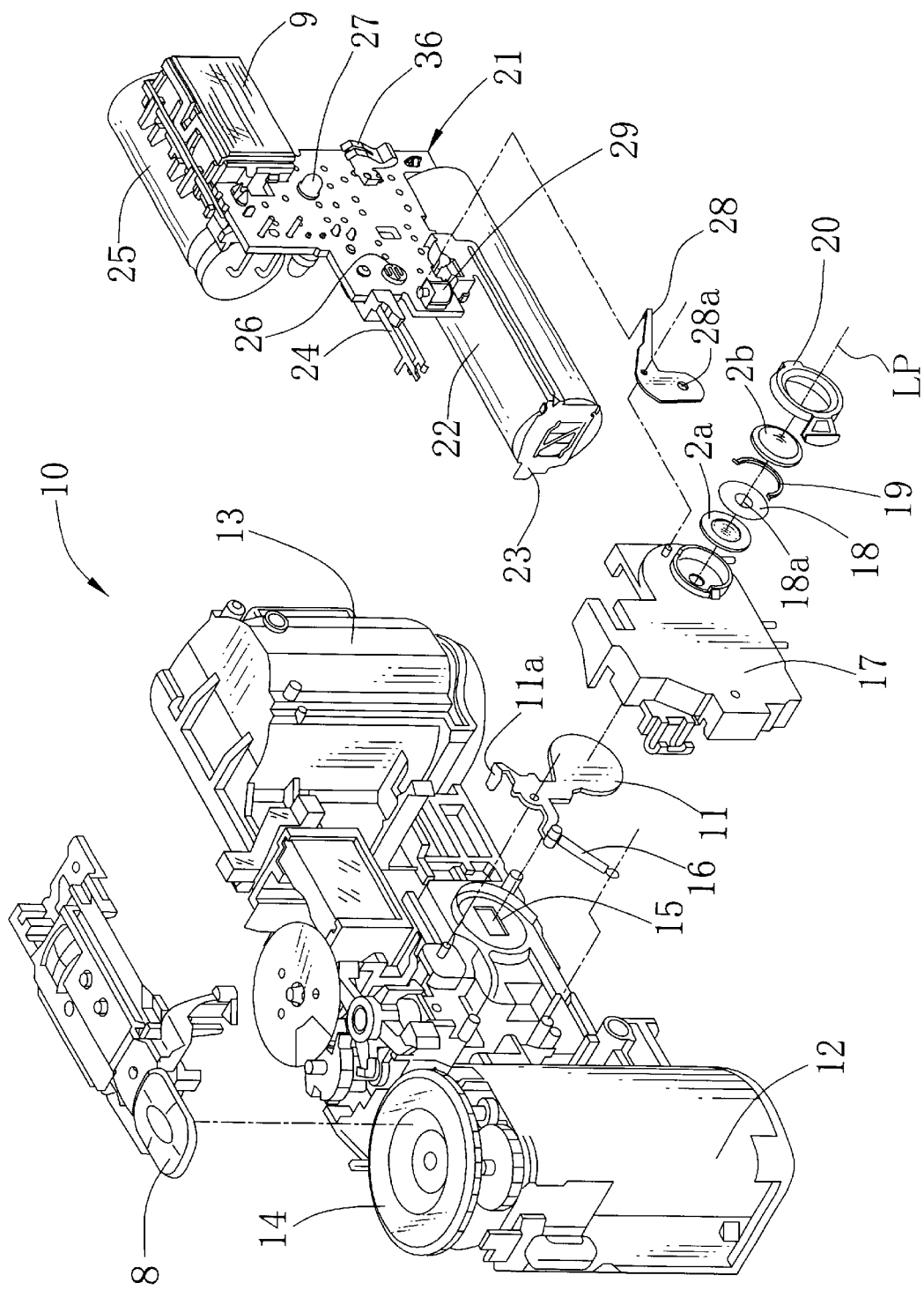
FIG. 2 is an exploded perspective illustrating a main body.

In FIG. 2, a main body 10 is included in the lens-fitted photo film unit 1. A shutter device with a shutter blade 11 is incorporated in the main body 10. The shutter device is a knocking type. A delay mechanism (not shown) is associated with the shutter device, and operates for creating time lag between depression of the shutter release button 8 and start of movement of the shutter blade 11 so as to keep the shutter blade 11 from moving before completion of changing over the aperture stop device.

The main body 10 includes a cassette holder chamber 12 and a roll holder chamber 13. The cassette holder chamber 12 contains a photo film cassette. The roll holder chamber 13 contains a roll of unexposed photo film drawn out of the photo film cassette. A winder wheel 14 has a lower core portion, which is engaged with a spool in the photo film cassette. Each time after one exposure is taken, a portion of the photo film as long as one frame is moved toward the inside of the cassette by winding operation. The shutter device is charged by the winding operation, to stand by for another exposure.

A light shielded tunnel for defining an optical light path, and has a shutter opening 15 disposed behind the shutter blade 11. An exposure aperture is formed as a rear opening of the light shielded tunnel, and adapted for exposing a portion of the photo film opposed thereto. A return spring 16 has one end secured to the shutter blade 11, and a second end secured to the main body 10. Thus, the shutter blade 11 is biased toward a closed position to shut the shutter opening 15. In front of the shutter blade 11 are disposed a lens holder 17, a lens element 2a, a stationary aperture stop plate 18, a spacer 19, a lens element 2b, and a lens fastening plate 20.

The taking lens 2 is constituted by the lens elements 2a and 2b. A stationary stop opening 18a is formed in the stationary aperture stop plate 18. A movable aperture stop plate 28 is movable into and out of a space defined between the stationary aperture stop plate 18 and the lens element 2b by means of the spacer 19. A pivot projects from the lens holder 17, and supports the movable aperture stop plate 28 rotatably. A stop-down opening 28a is formed in the movable aperture stop plate 28, and has a size smaller than the stationary stop opening 18a of the stationary aperture stop plate 18.

When the movable aperture stop plate 28 is retracted from the photographic light path LP, the aperture stop is set as a large aperture state, in which the stationary stop opening 18a in the stationary aperture stop plate 18 defines the exposure amount. When the movable aperture stop plate 28 is set in the photographic light path LP, the aperture stop is set as a small aperture state, in which the stop-down opening 28a of the movable aperture stop plate 28 defines the exposure aperture. An aperture stop device is constituted by the stationary aperture stop plate 18, the movable aperture stop plate 28 and an aperture stop plate drive circuit 40 or changer unit depicted in FIG. 3.

There is a flash circuit board 21 on which various elements are mounted, including the flash emitter 9, a battery contact segment 23, a sync switch 24 and a main capacitor 25. A battery 22 is held by the battery contact segment 23. Also, the flash circuit board 21 has a CdS element 26 and a photo transistor 27 as sensor mounted thereon. The CdS element 26 measures object brightness. The photo transistor 27 measures reflected flash light. The CdS element 26 is disposed behind the brightness measuring window 4. The photo transistor 27 is disposed behind the measuring window 5.

A plate shifting solenoid 29 is disposed on the flash circuit board 21. When object brightness measured by the CdS element 26 is low, the plate shifting solenoid 29 is driven with electric energy from the battery 22, and shifts a plunger. The movable aperture stop plate 28 is connected with the plunger. When the plate shifting solenoid 29 is driven, the movable aperture stop plate 28 moves away from the photographing light path LP, to determine the large aperture state. If the object brightness is high, the plate shifting solenoid 29 is kept turned off. The movable aperture stop plate 28 is located in the photographic light path LP, to determine the small aperture state.

Figure 3:
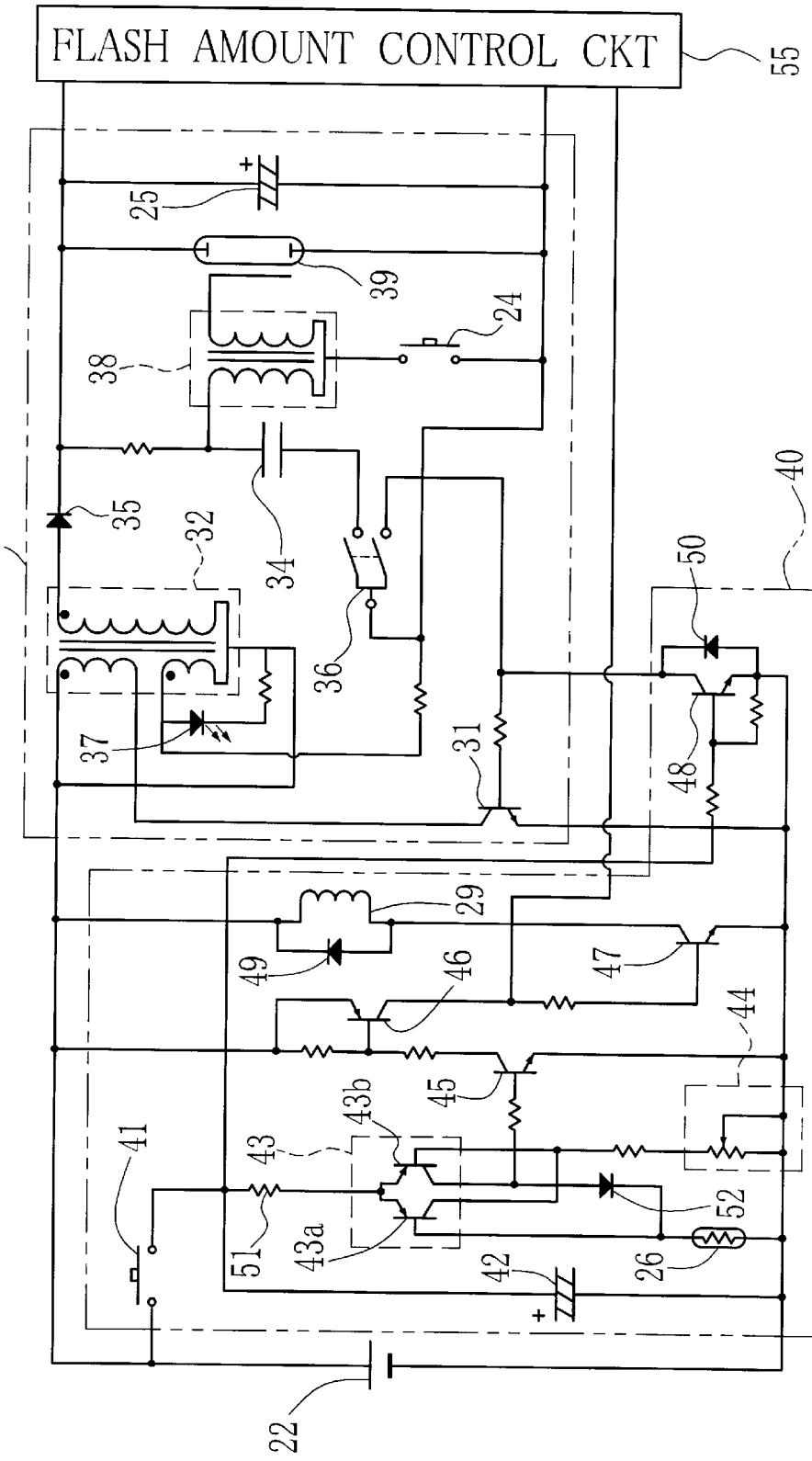
FIG. 3 is a block diagram illustrating a flash circuit and an aperture stop plate drive circuit.
Figure 4:
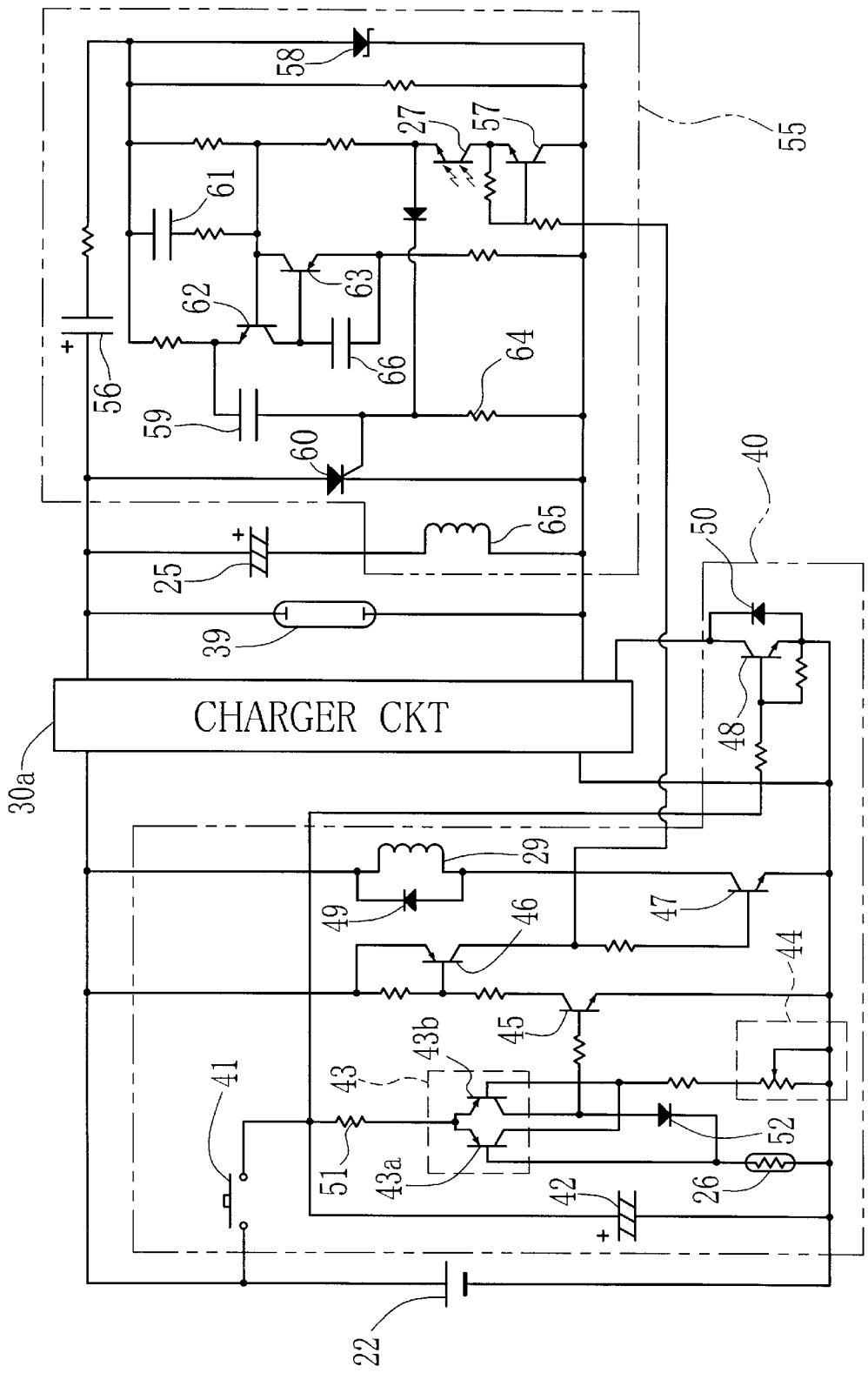
FIG. 4 is a block diagram illustrating the aperture stop plate drive circuit and a flash amount control circuit.

In FIGS. 3 and 4, a flash emitting circuit 30 includes a blocking oscillator, which is constituted by an oscillation transistor 31 and an oscillation transformer 32. When the flash switch lever 6 is set in the ON position, the blocking oscillator converts a current from the battery 22 at a low voltage into a current at high voltage of approximately 300 volts, and charges the main capacitor 25 and a trigger capacitor 34. A diode 35 is connected between the oscillation transformer 32 and the capacitors 25 and 34, and rectifies the alternate current generated by the blocking oscillator according to the half-wave rectification. A blade head portion 11a projects from the shutter blade 11, and turns on the sync switch 24 when the shutter blade 11 moves in the opening direction. The sync switch 24 causes discharge of the trigger capacitor 34. A trigger transformer 38 is supplied with a current of the discharge, and outputs trigger voltage at a high level. A flash discharge tube 39 is triggered as breakdown is caused by the trigger voltage. The main capacitor 25 is discharged, charge from which passes through the flash discharge tube 39 to emit flash light.

A light measuring switch 41 is provided in the aperture stop plate drive circuit 40, and becomes turned on when the shutter release button 8 is halfway depressed. When the light measuring switch 41 is turned on, a capacitor 42 is charged. The capacitor 42 supplies the aperture stop plate drive circuit 40 with power even after the light measuring switch 41 is turned off. A variable resistor 44 has a predetermined resistance which becomes equal to that of the CdS element 26 at the time of incidence of light of reference brightness at which the aperture stop is changed over. A transistor pair 43 compares the electric resistance of the CdS element 26 with that of the variable resistor 44, and determines one of two steps of the object brightness.

The transistor pair 43 includes a high brightness conducting transistor 43a and a low brightness conducting transistor 43b. When light of high brightness is incident upon the CdS element 26, the high brightness conducting transistor 43a is conductive and the low brightness conducting transistor 43b remains nonconductive, because the resistance of the CdS element 26 is low.

When light of low brightness is incident upon the CdS element 26, the low brightness conducting transistor 43b is conductive and the high brightness conducting transistor 43a is nonconductive. Turning on of the low brightness conducting transistor 43b renders conductive a first transistor 45, a second transistor 46 and a third transistor 47 sequentially. As the third transistor 47 is turned on, the plunger is driven by the plate shifting solenoid 29 powered by the battery 22, to shift the movable aperture stop plate 28 away from the photographing light path LP. The large aperture state is determined.

A charger interrupting transistor 48 is turned on while the aperture stop plate drive circuit 40 is powered, in other words after turning on of the light measuring switch 41 and until discharge of the capacitor 42. The base of the oscillation transistor 31 is short-circuited. During operation of measuring light, the charging is suppressed forcibly, to ensure powering to the plate shifting solenoid 29. Diodes 49 and 50 are connected in parallel with the third transistor 47 and the charger interrupting transistor 48, and prevent the transistors from being destroyed by back electromotive force generated by driving the plate shifting solenoid 29.

A resistor 51 is connected between the light measuring switch 41 and the transistor pair 43, and reduces influence of chattering of the light measuring switch 41 to stabilize operation of the transistor pair 43. A diode 52 prevents the movable aperture stop plate 28 from moving erroneously due to instantaneous changes in the object brightness during an exposure, or due to electrical noise. A current from the base of the high brightness conducting transistor 43a is prevented by the diode 52 from flowing to the first transistor 45. Also, the diode 52 keeps the high brightness conducting transistor 43a nonconductive at the time of low brightness by raising potential of the base of the high brightness conducting transistor 43a.

In FIG. 4, a flash amount control circuit 55 includes a capacitor 56 as power source. The flash emitting circuit 30 charges the capacitor 56 at the high voltage at the same time as the main capacitor 25 and the trigger capacitor 34 are charged. A photometry control transistor 57 has a base connected with a collector of the second transistor 46. When the low brightness conducting transistor 43b becomes conductive, the photometry control transistor 57 also becomes conductive together with the first, second and third transistors 45, 46 and 47.

As the capacitor 56 is discharged, a current from the flash discharge tube 39 flows in two paths, one with a Zener diode 58 and another with a gate capacitor 59. A thyristor 60 as silicon controlled rectifier (SCR) has a gate, with which the gate capacitor 59 is connected. The gate capacitor 59 is charged at a voltage of nearly 5.6 volts upon discharge of the capacitor 56. If the photometry control transistor 57 is conductive at this time, a photoelectric current flows between an emitter and collector of the photo transistor 27 at a level according to intensity of light incident thereon. An integration capacitor 61 is supplied with the photoelectric current, and stores charge.

Latch transistors 62 and 63 become conductive when the integration capacitor 61 becomes charged to a predetermined voltage. At the same time, the gate capacitor 59 starts being discharged. A current from the gate capacitor 59 flows in a resistor 64. A pulse generated by discharge of the gate capacitor 59 is applied to the gate of the thyristor 60, which is turned on.

When the thyristor 60 is turned on, a current from the main capacitor 25 being discharged flows through the thyristor 60. The flash emission of the flash discharge tube 39 is quenched. Note that a choke coil 65 is connected for protecting the thyristor 60 by preventing a current output by the main capacitor 25 from flowing at an excessively high frequency. A noise absorbing capacitor 66 absorbs electric noise, and prevents the latch transistors 62 and 63 from erroneous operation.

The operation of the above construction is described now. For the daylight photography, a photographic field is framed before the shutter release button 8 is depressed. Upon half depression of the shutter release button 8, the light measuring switch 41 is turned on, to supply the aperture stop plate drive circuit 40 with power. As resistance of the CdS element 26 changes according to object brightness, one transistor included in the transistor pair 43 becomes conductive according to the resistance of the CdS element 26. In the daylight photography with high brightness, the high brightness conducting transistor 43a is turned on. So no power is supplied to the plate shifting solenoid 29. Thus, the movable aperture stop plate 28 determines the small aperture state as inserted the photographic light path LP. Upon full depression of the shutter release button 8, the shutter blade 11 is actuated in a manner known in the art of camera. Light passed through the stop-down opening 28a exposes the photo film.

In the rear light scene, a background object is considerably bright in contrast with a principal object with less light. The use of daylight synchronization photography with flash light is designated according to the rear light scene. The flash switch lever 6 is slid up and set in the ON position. In response, a flash charger switch 36 is turned on. A charger circuit 30a starts operation, to charge the main capacitor 25, the trigger capacitor 34 and the capacitor 56.

Light at the LED 37 is checked through the standby indicator window 7, before the shutter release button 8 is depressed. The light measuring switch 41 is turned on to power the aperture stop plate drive circuit 40. Operation of the charger circuit 30a is discontinued because the charger interrupting transistor 48 becomes conductive.

The high brightness conducting transistor 43a is rendered conductive because the object brightness is high. As the first, second and third transistors 45, 46 and 47 are still nonconductive, there is no powering of the solenoid. The small aperture state is kept because the movable aperture stop plate 28 is set in the photographic light path LP. As the photometry control transistor 57 is nonconductive in the small aperture state, there is no adjustment of light in the flash amount control circuit 55.

The shutter release button 8 is fully depressed. The shutter blade 11 is actuated to open the shutter opening 15. In the movement of opening the shutter opening 15, the sync switch 24 is turned on. The trigger circuit is driven to trigger the flash discharge tube 39. The flash discharge tube 39 is supplied with charge from the main capacitor 25 and the capacitor 56, and emits flash light. As the photometry control transistor 57 is nonconductive, no reflected flash light is measured at the photo transistor 27. All the charge stored by the main capacitor 25 and the capacitor 56 passes through the flash discharge tube 39. Thus, the flash discharge tube 39 emits flash light fully.

It is to be noted that, if the shutter release button 8 is depressed quickly, the light measuring switch 41 is turned off while the aperture stop is changed over. However, the aperture stop plate drive circuit 40 continues to operate until completion of operation of the shutter device, because the capacitor 42 powers the aperture stop plate drive circuit 40. Upon discharge of the capacitor 42, powering to the aperture stop plate drive circuit 40 is discontinued. Then the charger interrupting transistor 48 becomes nonconductive.

After flash photography, the charger interrupting transistor 48 is rendered nonconductive while the flash switch lever 6 is set in the ON position. At the same time, the charger circuit 30a starts operation, to charge the flash device.

If a photographic object is located indoors with much illumination, or outdoors in a cloudy weather, the scene can be photographed without flash light in spite of relatively low brightness. The flash switch lever 6 is set in the OFF position. The shutter release button 8 is depressed halfway, so as to drive the aperture stop plate drive circuit 40. As the brightness of the scene is low, the low brightness conducting transistor 43b becomes conductive, to render conductive the first, second and third transistors 45, 46 and 47. Turning on of the third transistor 47 energizes the plate shifting solenoid 29. The movable aperture stop plate 28 is shifted away from the photographic light path LP. The stationary stop opening 18a of the stationary aperture stop plate 18 is effective for an exposure, to determine the large aperture state. Upon full depression of the shutter release button 8, the shutter blade 11 is actuated to take an exposure in the large aperture state without flash light.

In case of a photographic object in a scene at night or indoors without bright illumination, flash light is required. The flash switch lever 6 is set in the ON position to energize the charger circuit 30a. The shutter release button 8 is halfway depressed, to render the low brightness conducting transistor 43b conductive. The plate shifting solenoid 29 shifts the movable aperture stop plate 28 away from the photographic light path LP, to determine the large aperture state. As the second transistor 46 is conductive, the photometry control transistor 57 becomes conductive to stand by for the operation of light adjustment.

When the shutter release button 8 is depressed fully, the sync switch 24 is turned to drive the flash discharge tube 39 for flash emission as described before. During the flash photography, flash light reflected by an object enters the measuring window 5 and comes incident upon the photo transistor 27. The integration capacitor 61 is charged by the photoelectric current generated by the photo transistor 27. When a voltage of the integration capacitor 61 comes up to a predetermined level, the latch transistors 62 and 63 are rendered conductive, to discharge the gate capacitor 59. In response to this, the thyristor 60 is turned on. The flash discharge tube 39 is short-circuited, and stopped from emitting flash light.

After the quench of flash emission, a current flows to the thyristor 60 from the main capacitor 25 and the capacitor 56 by discharge of remaining charge in those capacitors. The flash amount control circuit 55 becomes turned off by discharge of the capacitor 56. As has been described above, the aperture stop plate drive circuit 40 stops being energized after the exposure with flash light. The charger circuit 30a starts operation.

In the above embodiment, the flash amount control circuit 55 is controlled according to turning on and off of the plate shifting solenoid 29 associated with the movable aperture stop plate 28. Furthermore, similar results can be obtained if a base of the photometry control transistor 57 is connected with a collector of the first transistor 45. It is preferable that the photometry control transistor 57 should be a p-n-p transistor.

In FIG. 5, a preferred embodiment is depicted, in which the aperture stop is manually changed over. A lens-fitted photo film unit 70 includes a mode selector 71 in a form of flash switch lever or button, which is positioned for one of three preset photographing modes. To indicate the three modes, words of "NO FLASH", "REAR LIGHT" and "NIGHT" are formed in the surface of the lens-fitted photo film unit 70. The "flash off-mode" is associated with a position of NO FLASH, is used for daylight photography without flash light. The aperture stop device is changed over according to object brightness. In the rear light photographing mode, flash light is emitted in the small aperture state. In the NIGHT photographing mode, flash light is emitted in the large aperture state.

Figure 6A:
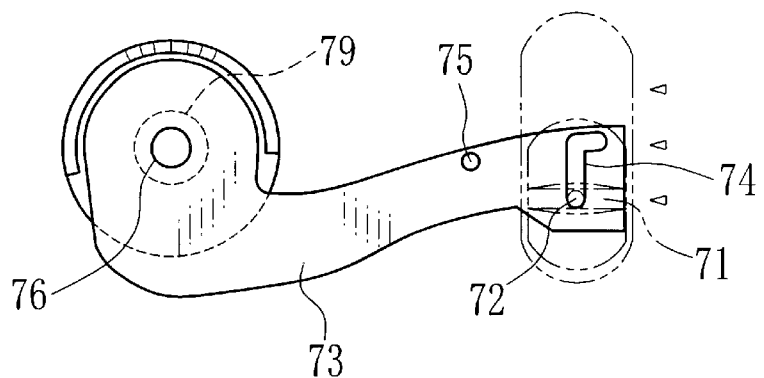
FIG. 6A is an explanatory view illustrating a flash off-mode.
Figure 6B:
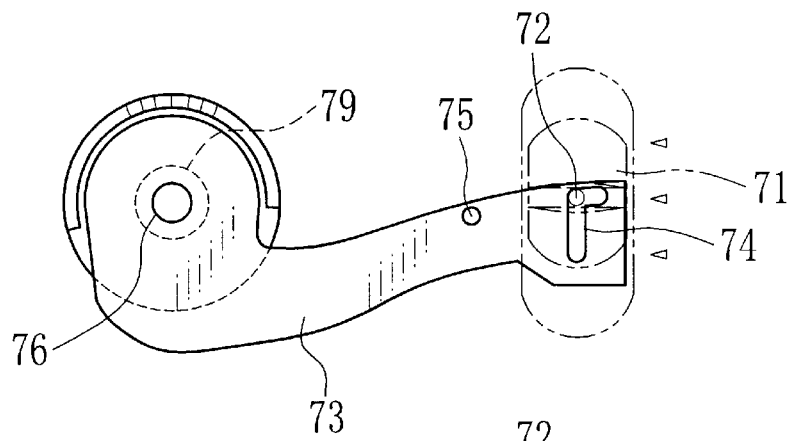
FIG. 6B is an explanatory view illustrating a first flash mode.
Figure 6C:
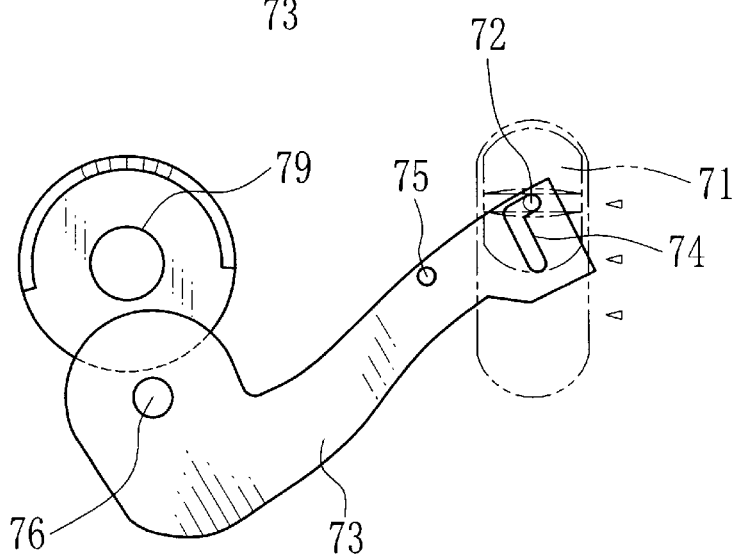
FIG. 6C is an explanatory view illustrating a second flash mode.

In FIGS. 6A–6C, a pin 72 protrudes from a rear surface of the mode selector 71. A movable aperture stop plate 73 is supported on a pivot 75 rotatably. An L-shaped slot 74 and a stop-down opening 76 are formed in the movable aperture stop plate 73. The pin 72 is loosely inserted in the L-shaped slot 74. In FIGS. 6A and 6B, the mode selector 71 is positioned at the indications of NO FLASH and REAR LIGHT. Then the stop-down opening 76 is positioned in the photographic light path to determine the small aperture state. In FIG. 6C, the mode selector 71 is positioned for the NIGHT mode. Then the movable aperture stop plate 73 is shifted away from the photographic light path. A stationary stop opening 79 is set for defining the large aperture state.

Figure 7:
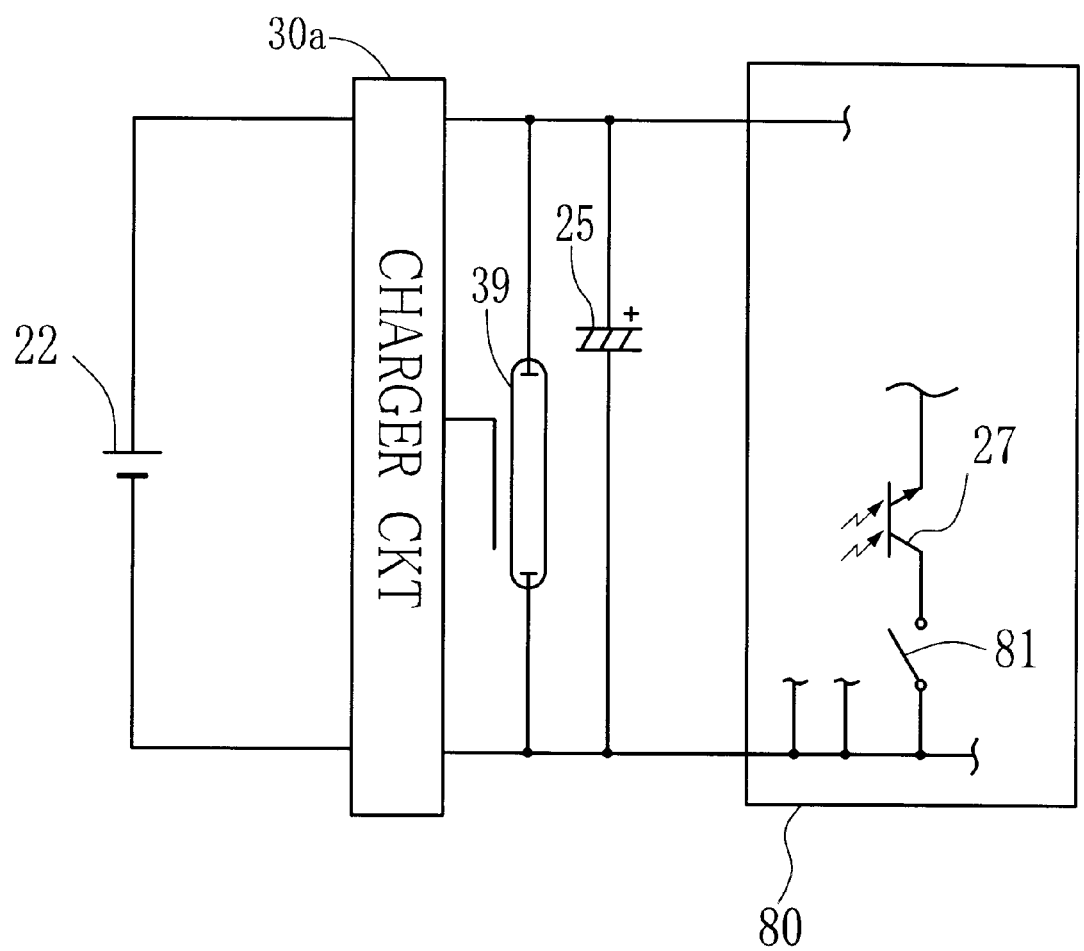
FIG. 7 is a block diagram illustrating relevant elements of flash amount control circuit for use in the embodiment of FIG. 5.

In FIG. 7, a flash amount control circuit 80 is incorporated in the lens-fitted photo film unit 70. A switch 81 is connected with the flash amount control circuit 80. When the mode selector 71 is slid to the "NIGHT" position, the switch 81 is turned on. Note that the flash amount control circuit 80 is the same as the flash amount control circuit 55 except for the switch 81 in place of the photometry control transistor 57 in FIG. 4.

In daylight photography, the mode selector 71 is set in the NO FLASH position for the flash off-mode. The flash device is turned off. The movable aperture stop plate 73 is set in the photographic light path. An exposure is taken in the small aperture state.

In the rear light scene, the mode selector 71 is set in the REAR LIGHT position. According to the position of the mode selector 71, the flash switch (See FIG. 3) is turned on. The switch 81 is turned off. As the flash switch is turned on, the flash device starts being charged. The object brightness is high. The small aperture state is determined because the movable aperture stop plate 73 is located in the photographic light path. As the switch 81 is turned off, the operation of the flash amount control circuit 80 is inhibited. The flash discharge tube emits light in full emission in the small aperture state. A principal object with rear light can be photographed with an optimized exposure.

In the case of photography at night or indoors, the mode selector 71 is set at the NIGHT position. According to this, a flash switch is turned on to charge the flash device. The switch 81 is turned on when the mode selector 71 is in the NIGHT position. The flash amount control circuit 80 is enabled to operate. As the object brightness is low at night, the movable aperture stop plate 73 is shifted away from the photographic light path, to determine the large aperture state. An exposure is taken with flash light in the large aperture state. As has been described above, the flash amount control circuit 80 automatically adjusts an amount of flash light.

In FIG. 8, a preferred embodiment is illustrated, in which a flash light amount is raised by lowering sensitivity of the photo sensor. A mode selector 86 or flash switch lever or button 86 is slid to rotate the movable aperture stop plate 73 for the same purpose of changing over the aperture stop. A filter plate 87 moves up and down according to movement of the mode selector 86. An opening 88 is formed in the filter plate 87.

The filter plate 87 is a colored transparent plate, film or sheet, for example gray, for transmitting incident light and for reducing intensity of the light.

Figure 9A:
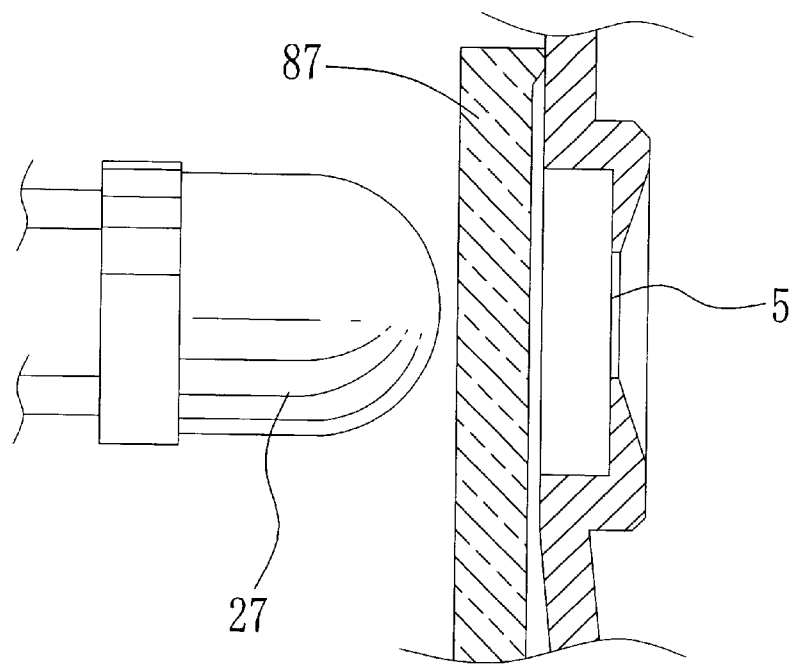
FIG. 9A is a cross section illustrating a state of setting the filter plate in front of the sensor.

When the mode selector 86 is set in the NO FLASH or REAR LIGHT position, the filter plate 87 is set behind the measuring window 5. See FIG. 9A. The filter plate 87 reduces light passed through the measuring window 5. Light incident upon the photo transistor 27 is reduced in photographing the rear light scene with the flash device. Consequently, an amount of flash light to be emitted is set higher.

Figure 9B:
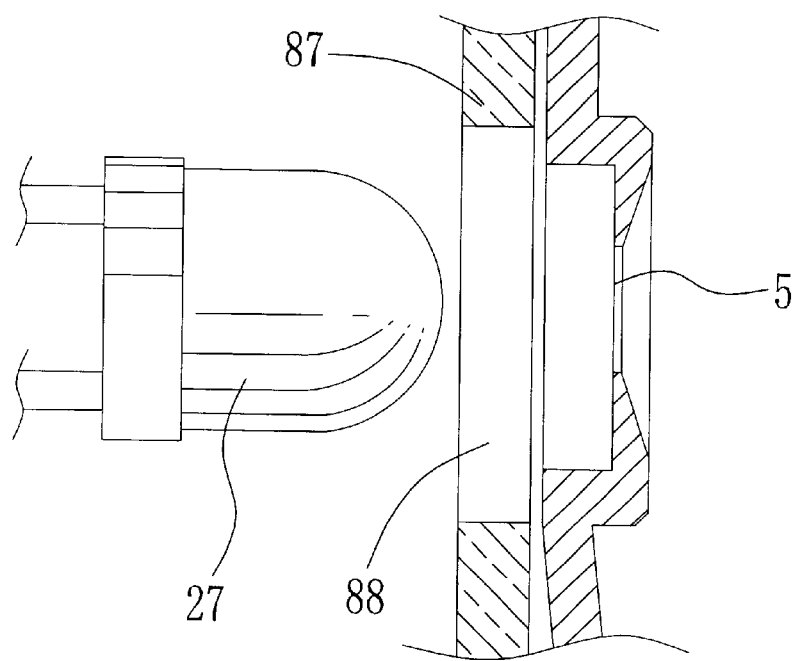
FIG. 9B is a cross section illustrating a state of offsetting the filter plate from the sensor.

When the mode selector 86 is set in the NIGHT position, the opening 88 is positioned behind the measuring window 5. See FIG. 9B. Light introduced into the measuring window 5 reaches the photo transistor 27 without a change. So the flash amount control circuit 80 operates for the control in an original manner.

As has been described heretofore, an amount of flash light in the small aperture state is determined higher than that in the large aperture state in photographing the same object. In the case of an object at a far distance, the flash device is caused to emit flash in full emission even in the large aperture state. The light amount of the flash light is equal between the small and large aperture states. In the above embodiment, the flash light is changed over according to changing over the aperture stop. However, the light amount of the flash light can be changed over in a separate manner from changing over of the aperture stop.

In the embodiment of FIG. 8, the filter plate is used to regulate operation of the flash amount control circuit optically. However, a blocking plate may be used instead of the filter plate, and may block the reflected flash light to avoid entry of the light.

In FIG. 4, a preferred embodiment is depicted, in which the photo transistor 27 or a sensor is nonconductive to restrict operation of the flash amount control circuit electrically. To restrict operation of the flash amount control circuit, it is possible to disconnect at least two of the capacitor 56, the thyristor 60 and the integration capacitor 61 from one another in FIG. 4. Also, it is possible to use a resistor circuit being changeable between high resistance and low resistance. The resistor circuit may be additionally connected in series with the integration capacitor 61. A current flowing to the integration capacitor 61 may be changed over stepwise between high and low currents.

Furthermore, it is also possible to set the stop-down opening 28a away from the photographic light path LP in an original step or normal state, and to set the stop-down opening 28a in the photographic light path LP if object brightness is high. The movable aperture stop plate 28 (See FIG. 2) is secured to the plunger of the plate shifting solenoid 29 in such a manner that the stop-down opening 28a is set away from the photographic light path LP when the plate shifting solenoid 29 is turned off. When the plate shifting solenoid 29 is turned on, the stop-down opening 28a is set in the photographic light path LP.

Figure 10:
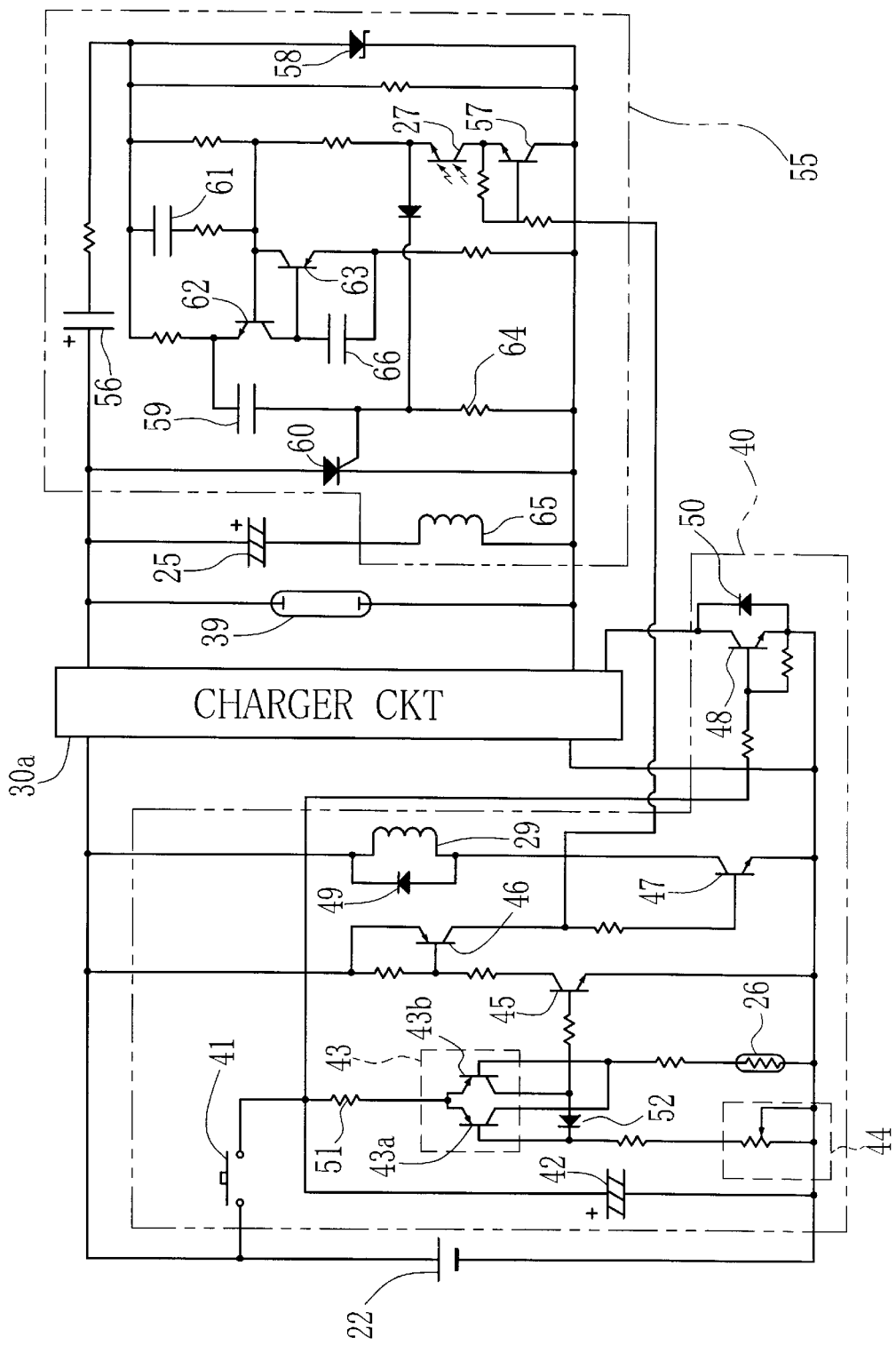
FIG. 10 is a block diagram illustrating another preferred aperture stop plate drive circuit and the flash amount control circuit.

In FIG. 10, circuits for this structure are depicted. Portions different from those according to FIG. 4 are the CdS element 26 and the variable resistor 44 with a resistor. The bases of the high and low brightness conducting transistors 43a and 43b in the transistor pair 43 are connected with the variable resistor 44 and the CdS element 26 in a manner opposite to the manner of FIGS. 3 and 4. When object brightness is high, the plate shifting solenoid 29 is turned on. The collector of the second transistor 46 sends a high signal to the flash amount control circuit 55, to render the photometry control transistor 57 conductive. In the thyristor 60, the gate and cathode are short-circuited. So the automatic light adjustment is disabled.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, including a flash emitter for emitting flash light toward a photographic object in flash photography, a flash amount control circuit for quenching flash emission of said flash emitter when a value of integration of light reflected by said object in said flash photography comes up to a predetermined level, said light being measured by a first sensor, and an aperture stop device for designating one of a large aperture state and a small aperture state, said lens-fitted photo film unit comprising:

means for regulating operation of said flash amount control circuit in order to raise an amount of said flash light at a time of said flash photography only when said small aperture state is designated.

2. A lens-fitted photo film unit as defined in claim 1, wherein said aperture stop device includes a stationary stop opening disposed in a photographic light path, a movable aperture stop plate shiftable into and out of said photographic light path, and a small-size stop-down opening formed in said movable aperture stop plate, wherein said movable aperture stop plate is set away from said photographic light path if said large aperture state is designated, and is set in said photographic light path if said small aperture state is designated.

3. A lens-fitted photo film unit as defined in claim 2, wherein said aperture stop device further includes:

a second sensor for measuring brightness of said object; and an aperture stop plate drive unit for shifting said movable aperture stop plate according to said object brightness, so as to shift said movable aperture stop plate away from said photographic light path when said object brightness is low, and into said photographic light path when said object brightness is high.

4. A lens-fitted photo film unit as defined in claim 3, wherein said regulating means includes a switch, responsive to a signal from said aperture stop plate drive unit, for disabling said flash amount control circuit if said small aperture state is designated, and for enabling said flash amount control circuit if said large aperture state is designated.

5. A lens-fitted photo film unit as defined in claim 4, wherein said switch is a semiconductor switch, connected in series with said first sensor, being nonconductive if said small aperture state is designated, and being conductive if said large aperture state is designated.

6. A lens-fitted photo film unit as defined in claim 2, further comprising an externally operable mode selector for designating a selected one of a flash off-mode, a first flash mode, and a second flash mode, to disable said flash emitter in designating said flash off-mode, to enable said flash emitter in designating said first or second flash mode, to set said movable aperture stop plate in said photographic light path in designating said first flash mode, and to set said movable aperture stop plate away from said photographic light path in designating said second flash mode.

7. A lens-fitted photo film unit as defined in claim 6, wherein said movable aperture stop plate is connected with said mode selector.

8. A lens-fitted photo film unit as defined in claim 7, wherein said regulating means includes a filter plate for moving according to said mode selector, said filter plate is disposed in front of said first sensor when said first flash mode is selected, and is disposed away from said first sensor when said second flash mode is selected.

9. A lens-fitted photo film unit as defined in claim 7, wherein said regulating means includes a switch, changed over by said mode selector, for disabling said flash amount control circuit when said first flash mode is selected, and for enabling said flash amount control circuit when said second flash mode is selected.

10. A lens-fitted photo film unit as defined in claim 9, wherein said switch is connected in series with said first sensor, is turned off when said first flash mode is selected, and is turned on when said second flash mode is selected.

11. A lens-fitted photo film unit, including a flash emitter for emitting flash light toward a photographic object in flash photography, a sensor for measuring light reflected by said object in said flash photography, and a flash amount control circuit for integration of a signal from said sensor, and for quenching flash emission of said flash emitter when a value of said integration comes up to a predetermined level, said lens-fitted photo film unit comprising:

an externally operable mode selector for designating a selected one of a flash off-mode, a first flash mode, and a second flash mode, to disable said flash emitter in designating said flash off-mode, to effect said flash photography in designating said first or second flash mode, to determine a small aperture state in designating said first flash mode, and to determine a large aperture state in designating said second flash mode;

an aperture stop device, including a stationary stop opening disposed in a photographic light path, a movable aperture stop plate shiftable into and out of said photographic light path, and a small-size stop-down opening formed in said movable aperture stop plate, wherein said movable aperture stop plate is associated with said mode selector, designates a selected one of said large and small aperture states, is disposed away from said photographic light path if said large aperture state is designated, and is disposed in said photographic light path if said small aperture state is designated; and a filter, associated with said mode selector, set in front of said sensor when said first flash mode is selected, and offset from said sensor when said second flash mode is selected.

12. A lens-fitted photo film unit, including a flash emitter for emitting flash light toward a photographic object in flash photography, a sensor for measuring light reflected by said object in said flash photography, and a flash amount control circuit for integration of a signal from said sensor, and for quenching flash emission of said flash emitter when a value of said integration comes up to a predetermined level, said lens-fitted photo film unit comprising:

an externally operable mode selector for designating a selected one of a flash off-mode, a first flash mode, and a second flash mode, to disable said flash emitter in designating said flash off-mode, to effect said flash photography in designating said first or second flash mode, to determine a small aperture state in designating said first flash mode, and to determine a large aperture state in designating said second flash mode;

an aperture stop device, including a stationary stop opening disposed in a photographic light path, a movable aperture stop plate shiftable into and out of said photographic light path, and a small-size stop-down opening formed in said movable aperture stop plate, wherein said movable aperture stop plate is associated with said mode selector, designates a selected one of said large and small aperture states, is set away from said photographic light path if said large aperture state is designated, and is set in said photographic light path if said small aperture state is designated; and a switch, changed over by said mode selector, connected in series with said sensor, turned off when said first flash mode is selected, and turned on when said second flash mode is selected.

13. A lens-fitted photo film unit including a flash emitter for emitting flash light toward a photographic object in flash photography, a flash amount control circuit for quenching flash emission of said flash emitter when a value of integration of light reflected by said object in said flash photography comes up to a predetermined level, said light being measured by a first sensor, and an aperture stop device for designating one of a large aperture state and a small aperture state, said lens-fitted photo film unit comprising:

means for regulating operation of said flash amount control circuit in order to raise an amount of said flash light at a time of said flash photography when said small aperture state is designated;

wherein said aperture stop device includes a stationary stop opening disposed in a photographic light path, a movable aperture stop plate shiftable into and out of said photographic light path, and a small-size stop-down opening formed in said movable aperture stop plate, wherein said movable aperture stop plate is set away from said photographic light path if said large aperture state is designated, and is set in said photographic light path if said small aperture state is designated;

wherein said aperture stop device further includes:
a second sensor for measuring brightness of said object; and
an aperture stop plate drive unit for shifting said movable aperture stop plate according to said object brightness, so as to shift said movable aperture stop plate away from said photographic light path when said object brightness is low, and into said photographic light path when said object brightness is high;

wherein said regulating means includes a switch, responsive to a signal from said aperture stop plate drive unit, for disabling said flash amount control circuit if said small aperture state is designated, and for enabling said flash amount control circuit if said large aperture state is designated.

14. A lens-fitted photo film unit including a flash emitter for emitting flash light toward a photographic object in flash photography, a flash amount control circuit for quenching flash emission of said flash emitter when a value of integration of light reflected by said object in said flash photography comes up to a predetermined level, said light being measured by a first sensor, and an aperture stop device for designating one of a large aperture state and a small aperture state, said lens-fitted photo film unit comprising:

means for regulating operation of said flash amount control circuit in order to raise an amount of said flash light at a time of said flash photography when said small aperture state is designated;

wherein said aperture stop device includes a stationary stop opening disposed in a photographic light path, a movable aperture stop plate shiftable into and out of said photographic light path, and a small-size stop-down opening formed in said movable aperture stop plate, wherein said movable aperture stop plate is set away from said photographic light path if said large aperture state is designated, and is set in said photographic light path if said small aperture state is designated;

said lens-fitted photo film unit further comprising an externally operable mode selector for designating a selected one of a flash off-mode, a first flash mode, and a second flash mode, to disable said flash emitter in designating said flash off-mode, to enable said flash emitter in designating said first or second flash mode, to set said movable aperture stop plate in said photographic light path in designating said first flash mode, and to set said movable aperture stop plate away from said photographic light path in designating said second flash mode.

* * * * *